March 19, 1935. L. L. NAKASHIAN 1,994,588
AUTOMATIC ACCELERATING CLUTCH
Filed July 11, 1932

Inventor:
Luke Lewis Nakashian
By Charles H. Warren
Attorney

Patented Mar. 19, 1935

1,994,588

UNITED STATES PATENT OFFICE 1,994,588

AUTOMATIC ACCELERATING CLUTCH

Luke Lewis Nakashian, Worcester, Mass.

Application July 11, 1932, Serial No. 621,781

5 Claims. (Cl. 192—105)

The present invention relates to an improved accelerating clutch that is adapted to automatically establish a connection between rotatable driving and driven elements for the transmission of power therebetween, after the driving element has nearly attained its normal operating speed, and to disconnect said elements when the driving element ceases to have power applied thereto.

The object of the invention is to provide a clutch of the above indicated character that is adapted to permit the driving element to accelerate free of the load on the driven element until the driving element approaches full speed; the clutch being particularly suitable for automatically connecting an electric motor to loads requiring a relatively high starting torque. In operation, the load is imposed on the motor gradually and evenly until its full speed is nearly reached, whereupon the motor is positively clutched to the load, without shocks and strains on the motor and mechanism connected to the driving element. The above and other advantageous features of the invention will hereinafter more fully appear from the following description with reference to the accompanying drawing, in which:—

Like reference characters refer to like parts in the different figures.

Figure 1:
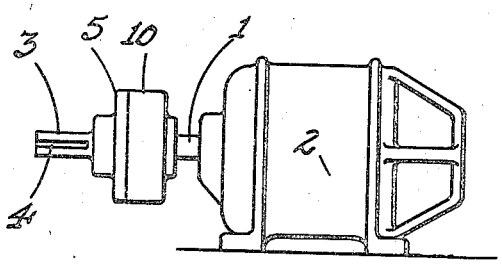
Fig. 1 is a view in side elevation of a clutch embodying the invention, as applied to an electric motor drive.

Referring to the drawing, the driving element is represented by a rotatable shaft 1, to which power is applied in any suitable manner from a prime mover, such as an electric motor 2, the shaft 1 being shown as directly connected to the rotor of the motor. The driven element is represented by a rotatable shaft 3 in alinement with the shaft 1 and adapted to be connected to a load, not shown, by a suitable keyway 4, with the clutch embodying the invention interposed between the shafts 1 and 3.

Figure 2:
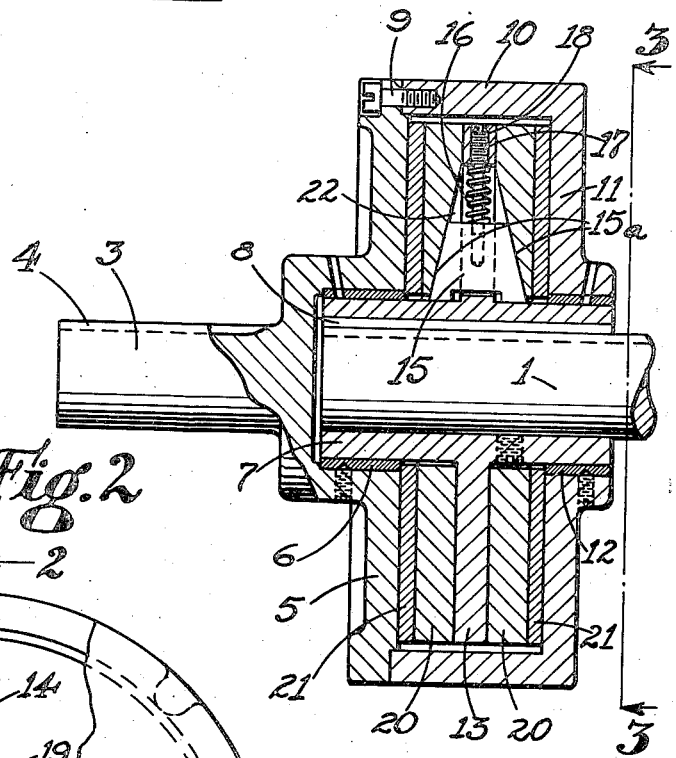
Fig. 2 is a longitudinal sectional view of the clutch shown in Fig. 1, on an enlarged scale.

As best shown in Fig. 2, the clutch comprises an annular flange 5 formed integrally with the shaft 3 and rotatably supported by a bearing 6 on a sleeve 7 rotatable with the driving shaft 1 through a key 8. The flange 5 is connected by screws 9 to a cylindrical drum 10, which provides an annular flange 11 spaced from and parallel to the flange 5, with the hub of the flange 11 rotatably supported in a bearing 12 surrounding the sleeve 7. The driven shaft 3 and the spaced flanges 5 and 11, with the drum 10 therebetween, thus form a unit rotatable on the driving shaft 1 and entirely enclosing the clutch mechanism next to be described.

Figure 3:
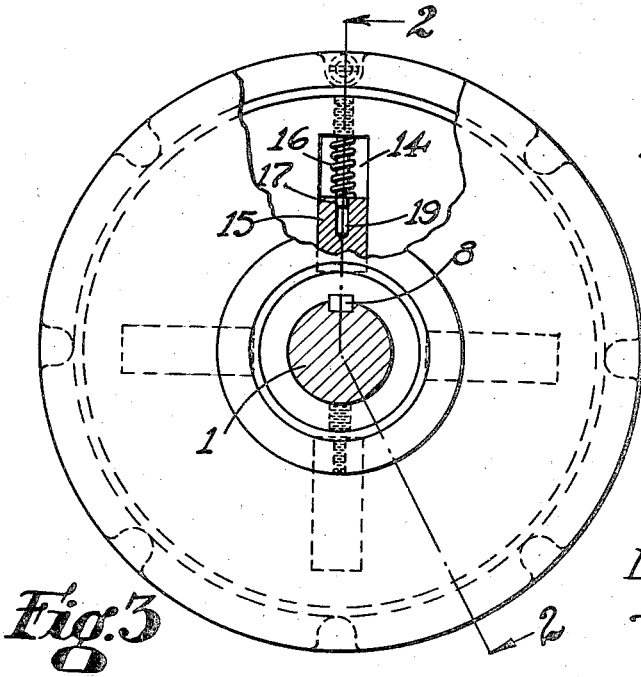
Fig. 3 is a vertical sectional view along the line 3—3 of Fig. 2, looking in the direction of the arrows.

The sleeve 7 carried by the shaft 1 provides a radial flange 13 spaced substantially midway between the flanges 5 and 11 of the driven element, and as best shown in Fig. 3, the flange 13 provides a number of radial slots 14, in each of which is slidably mounted a wedge 15 providing oppositely beveled faces 15a extending beyond the slot 14. Each wedge 15 is normally held seated at the inner end of its slot 14 by means of a spring 16 surrounding a stud 17 having its outer portion threaded into an opening 18 provided in the flange 13 and communicating with the slot 14. The inner end of each stud 17 is freely received in an opening 19 provided in a wedge 15, so that the wedge 15 is maintained symmetrically disposed with respect to the slot 14, although movable therein against pressure of the spring 16. Obviously, turning of the threaded portion of the stud 17 in the opening 18 permits the pressure exerted by the spring 16 on the wedge 15 to be readily adjusted.

Interposed between the beveled faces 15a of the wedges 15 and the inner faces of the flanges 5 and 11 are pairs of annular pressure plates 20 and disks 21 of frictional material, with each plate 20 providing a set of seats 22 corresponding in number to the wedges 15. As best shown in Fig. 2, opposed pairs of seats 22 of the plates 20 are adapted to freely receive the wedges 15, with the bottoms of the seats 22 having the same inclination as the beveled wedge faces 15a. By reason of the reception of the wedges 15 in the seats 22, both pressure plates 20 are adapted to rotate with the driving sleeve 7, and with the shaft 1 stationary, there is substantially no frictional engagement between the plates 20 and the clutching disks 21. Consequently, there is no initial connection between the shafts 1 and 3 and the motor 2 can accelerate free of the load on the driven element.

As the motor 2 speeds up, the pressure of the springs 16 tends to hold the wedges 15 in the position shown in Fig. 2, until centrifugal force developed by rotation of the shaft acts on the wedges to overcome the spring pressure. When this occurs, the wedges 15 simultaneously move radially outward in the slots 14 and the reaction of the beveled faces 15a with the seats 22 is such as to exert a pressure tending to shift the pressure plates 20 in opposite directions toward the flanges 5 and 11. This movement of the plates 20 tends to compress the friction disks 21 between the plates 20 and the opposed flanges 5 and 11, thereby imparting rotation of the driving shaft 1 to the driven shaft 3. Due to the formation of the wedges 15 and their seats 22, the pressure of the plates 20 is applied gradually and evenly, so that a complete engagement of the clutch is not obtained until the motor has attained its normal operating speed and is developing substantially full power.

I claim,

1. In an accelerating clutch, the combination with a rotating driving element providing an annular flange having radial slots therein, a series of wedges received in said slots, a rotatable driven element providing annular flanges on opposite sides of the first named flange and spaced therefrom, and frictional disks positioned between opposed faces of said flanges on said driving and driven elements respectively, of annular plates carried by said wedges and capable of sliding movement with respect thereto for converting radial movement of said wedges in response to centrifugal force developed by rotation of said driving member into movement in opposite directions along the axis of said driving element to compress said frictional disks and establish a power transmitting connection between said elements.

2. In an accelerating clutch, the combination with a rotating driving element providing an annular flange having radial slots therein, a series of wedges received in said slots, a rotatable driven element providing annular flanges on opposite sides of the first named flange and spaced therefrom, and frictional disks positioned between opposed faces of said flanges on said driving and driven elements respectively, of annular pressure plates interposed between said wedges and said friction disks, said plates being provided with slots for the reception of said wedges whereby said plates rotate with said wedges and exert pressure in opposite directions on said disks in response to radial movement of said wedges due to centrifugal force developed by rotation of said driving element.

3. In an accelerating clutch, the combination with a rotating driving element providing an annular flange having radial slots therein, a series of wedges slidably received in said slots, adjustable resilient members carried by said flange for yieldably maintaining said wedges at the bottoms of said slots, a rotatable driven element providing annular flanges on opposite sides of the first-named flange and spaced therefrom, and frictional disks positioned between opposed faces of said flanges on said driving and driven elements respectively, of annular pressure plates interposed between said wedges and said friction disks, with said wedges slidably received in inclined seats provided in said plates, rotation of said plates with said wedges being accompanied by simultaneous movement of said plates in opposite directions along the axis of said driving element, to compress said frictional disks in response to radial movement of said wedges when centrifugal force developed by rotation of said driving element overcomes the pressure of said springs.

4. In an accelerating clutch, the combination with a rotating driving element providing an annular flange having radial slots therein, a series of wedges slidably received in said slots, a rotatable driven element providing annular flanges oppositely disposed with respect to the first-named flange and spaced therefrom, and frictional disks positioned between opposed faces of the flanges on said driving and driven elements respectively, of annular pressure plates interposed between said wedges and said frictional disks with said wedges in sliding contact with opposed inclined faces provided by said plates and having the same inclination as said wedges, rotation of said pressure plates with said wedges being accompanied by simultaneous movement of said plates in opposite directions along the axis of the driving element in response to radial movement of said wedges due to centrifugal force developed by rotation of said driving element, to compress said frictional disks and establish a power transmitting connection between said elements.

5. In an accelerating clutch, the combination with a driving element providing an annular flange having radial slots therein, a series of wedges having parallel faces slidable between the walls of said slots with inclined faces extending beyond said slots, a rotatable driven element providing annular flanges oppositely disposed with respect to the first-named flange and spaced therefrom, and frictional disks positioned between opposed faces of the flanges on said driving and driven elements respectively, of annular pressure plates interposed between said wedges and said disks with oppositely inclined faces thereof in sliding contact with the correspondingly inclined faces of said wedges, rotation of said pressure plates with said wedges being accompanied by simultaneous movement of said plates in opposite directions along the axis of the driving element in response to radial movement of said wedges due to centrifugal force developed by rotation of said driving element to press said frictional disks against the flanges of said driven element and establish a power transmitting connection between said elements.

LUKE LEWIS NAKASHIAN.